United States Patent [19]

Kurihara et al.

[11] Patent Number: 4,848,529

[45] Date of Patent: Jul. 18, 1989

[54] AUTOMATIC TRANSMISSION SYSTEM

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 95,385

[22] Filed: Sep. 11, 1987

[30] Foreign Application Priority Data

Sep. 12, 1986 [JP] Japan .................................. 61-213779

[51] Int. Cl.⁴ ............................................. B60K 41/10
[52] U.S. Cl. .................... 192/0.076; 74/866
[58] Field of Search ........................ 74/866; 192/0.076

[56] References Cited

U.S. PATENT DOCUMENTS 4,714,145 12/1987 Kurihara et al. .
4,718,309 1/1988 Moriya .................................. 74/866
4,732,055 3/1988 Tateno .................................. 74/866

FOREIGN PATENT DOCUMENTS 60-11756 1/1985 Japan .
60-75735 4/1985 Japan .

*Primary Examiner*—Andrew J. James
*Assistant Examiner*—David Soltz
*Attorney, Agent, or Firm*—Pollock, Vande Sande & Priddy

[57] ABSTRACT

In an automatic transmission system in which a gear transmission and a clutch are electronically controlled so as to shift the transmission to the optimum gear position, the system comprises a first generator for generating a set of initial map data corresponding to the position of a selector, the initial map data being for determining an initial target gear position to which the gear should be initially shifted after the position of the selector is changed, and a second generator for generating a set of normal map data corresponding to the position of the selector, the normal map data being for determining a normal target gear position to which the gear should be shifted after the gear is shifted to the determined initial target position. One of the outputs of the first and second generators is selected and applied to a calculator in which the target gear position is calculated in accordance with the selected map data. The gear transmission is automatically shifted to the calculated gear position. When the gear transmission is in a transitory condition, the initial map data is selected, whereby inappropriate gear shift operation just after the position of the selector is changed can effectively be prevented.

9 Claims, 4 Drawing Sheets

AUTOMATIC TRANSMISSION SYSTEM

BACKGROUND OF THE INVENTION

The present invention relates to an automatic transmission system having a clutch and a gear transmission in which the operation for shifting gears is electronically controlled in accordance with shift map data.

In the prior art, to realize automization of the operation for shifting gears in the conventional transmission system having a clutch, such as a friction clutch, and a gear transmission, there has been proposed an electronically controlled transmission system in which actuators are associated with the clutch and the gear transmission, respectively, and the actuators are controlled by control signals issued from an electronic control device. In this kind of conventional electronically controlled automatic transmission system, the electronic control device has shift map data for determining the optimum gear position and the appropriate gear position at each instant is determined in response to the conditions of operation of an internal combustion engine associated with the gear transmission in accordance with the shift map data.

In general, there are a plurality of sets of shift map data, each set corresponding to a given position of a selector, so that the optimum gear position can be determined in accordance with the set of shift map data corresponding to the position of the selector selected by the driver at that time.

Therefore, when the selecting lever of the gear selector is changed, the gear of the transmission is subject to being shifted first to another position immediately after the selecting lever has been changed, and then shortly thereafter to a further position. That is, the automatic transmission is liable to carry out a gear shifting operation two times just after the selecting lever of the selector is changed. In the case where the transmission system is used in a passenger vehicle powered by an internal combustion engine, the passenger may receive an uncomfortable shock at this time. Furthermore, when the gear is shifted up or down just after the position of the selector is changed, it sometimes becomes difficult to obtain the required rotation torque from the output shaft of the gear transmission.

SUMMARY OF THE INVENTION

It is an object of the present invention to provide an improved automatic transmission system which is capable of eliminating the above-mentioned disadvantages of the prior art automatic transmission system.

It is another object of the present invention to provide an automatic transmission system which is capable of preventing the gear from being shifted up or down just after the position of the selector is changed.

According to the present invention, in an automatic transmission system having a gear transmission to which a rotational output from an internal combustion engine can be applied through a clutch, the system comprises a selector, means for producing a selected position signal indicative of the position of the selector, a sensing means for generating at least one condition signal showing at least one condition of the operation of the system, means for producing a position signal indicating the actual gear position set in the gear transmission, a first data generator responsive to the selected position signal for generating a set of initial gear shift map data corresponding to the position of the selector at that time, the initial gear shift map data being for determining an initial target gear position to which the gear should be initially shifted after the position of the selector is changed, a second data generator responsive to at least the selected position signal for generating a set of normal gear shift map data corresponding to the position of the selector at that time, the normal gear shift map data being for determining a normal target gear position to which the gear should be shifted after the gear is shifted to an initial target gear position determined in accordance with the initial gear shift map, a selecting means responsive to at least the selected position signal and the position signal for selecting one of the outputs of the first and second data generator, a calculating means responsive to the output from said selecting means and the condition signal for calculating a target gear position, a first actuating means associated with the transmission for actuating the operation for shifting the gear of the transmission, a second actuating means associated with the clutch for actuating the engaging/disengaging operation of the clutch, and a control means responsive to the output from the calculating means and the position signal for controlling the first and second actuating means so as to shift the gear to the target gear position.

The first data generator may have a first memory in which are stored a plurality of sets of initial gear shift map data determined so as to correspond to the respective positions of the selector. Thus, the corresponding set of initial gear shift map data can be read out in response to the selected position signal. In a similar manner, the second data generator may have a second memory in which are stored a plurality sets of normal gear shift map data determined so as to correspond to the respective positions of the selector. Thus, the corresponding set of normal gear shift map data can be read out in response to the selected position signal.

Conventional gear shift map data for ordinary gear shift operation may be used for the normal gear shift map data, and the initial gear shift map data is determined so as to be different therefrom in order to prevent the gear from being shifted just after the operation of the selector. Accordingly, it is preferable to determine both types of data in such a way that the characteristic lines indicating the boundary lines among a plurality of regions representing the respective gear shift positions in the gear shift characteristic plane for determining the initial gear shift position are not coincident with the characteristic lines in the gear shift characteristic plane for determining the normal gear shift position.

The selecting means selects the set of initial gear shift map data and applies it to the control means just after the position of the selector is changed. In contrast, the selecting means selects the set of normal gear shift map data and applies it to the control means after the gear is shifted to the initial gear shift position according to the set of initial gear shift map data. As a result, change of the target gear position just after the selector is switched over can be effectively prevented, enabling the system to prevent the occurrence of the uncomfortable shock. Therefore, in the case where the system is applied to vehicles powered by an internal combustion engine, it advantageously prevents any uncomfortable shock to the passengers.

The above and other objects, features and advantages of the present invention will become more apparent

DESCRIPTION OF THE PREFERRED EMBODIMENT

Figure 1:
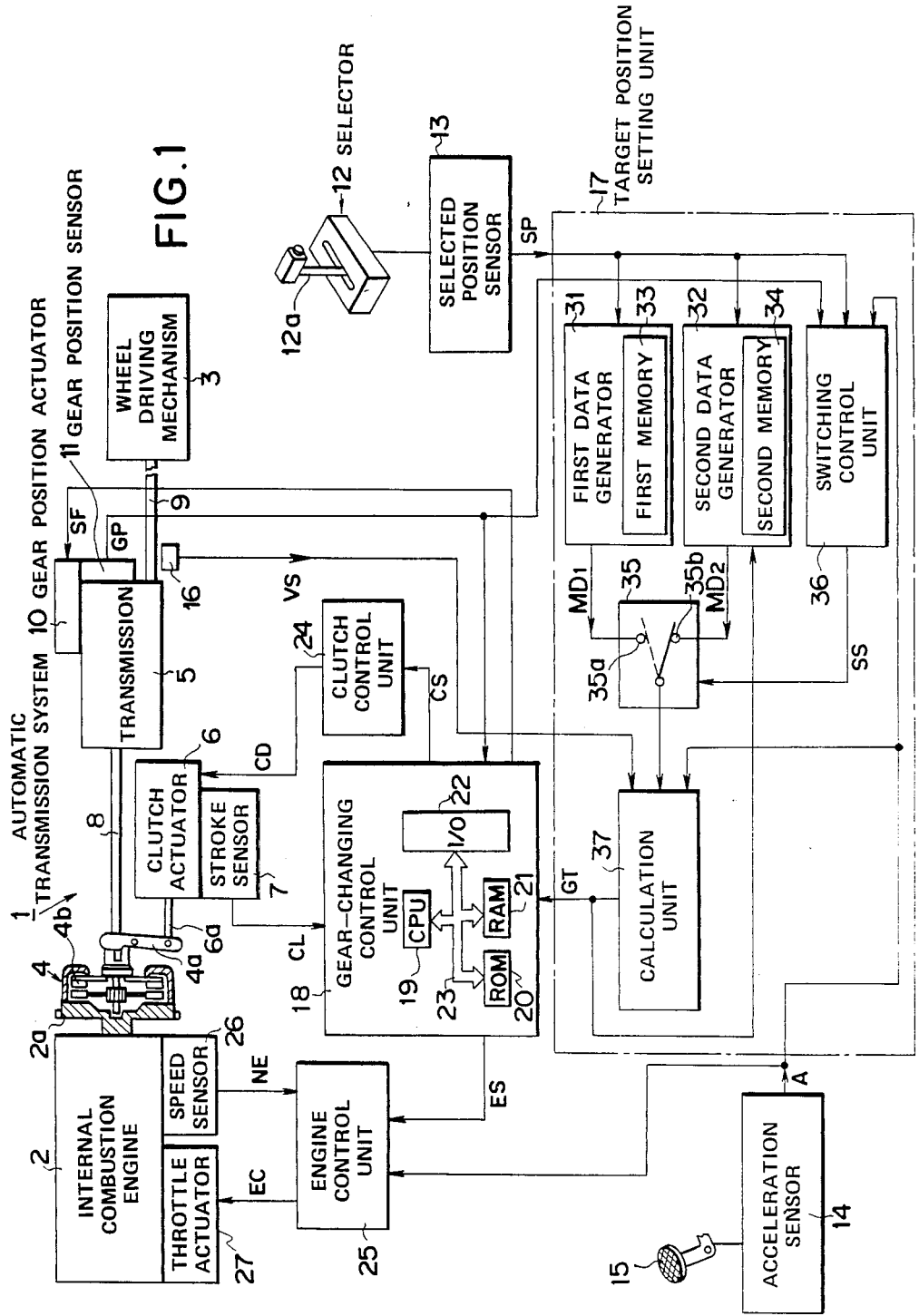
FIG. 1 is a block diagram showing an embodiment of an automatic transmission system according to the present invention, and showing a clutch in cross section.

FIG. 1 is a block diagram showing an embodiment of an automatic transmission system for vehicles according to the present invention. A vehicle (not shown) powered by an internal combustion engine 2 is equipped with an automatic transmission system 1 which comprises a friction clutch 4 mounted on an engine flywheel 2a and a synchromesh gear type transmission 5. The transmission 5 is a multi-stage transmission having first to sixth gear positions, a reverse gear position and a neutral position. In this embodiment the friction clutch 4 is a well-known dry-type single-disc clutch having a clutch release lever 4a. In order to control the engaging/disengaging operation of the clutch 4, there is provided a clutch actuator 6 having a piston rod 6a with a stroke sensor 7 for detecting the position of a clutch disc 4b of the clutch 4 and a clutch signal CL indicating the position of the clutch disc 4b is produced by the stroke sensor 7. The clutch 4 is connected by a connecting rod 8 with the transmission 5. The rotational output of the transmission 5 is transmitted through a propeller shaft 9 to a wheel driving mechanism 3 of the vehicle.

The gear-type transmission 5 is actuated by a gear changing actuator 10 associated therewith, and the gear position set in the transmission 5 is detected by a gear position sensor 11 associated with the transmission 5 to produce a gear position signal GP showing the set gear position.

The vehicle has a selector 12 with a selecting lever 12a that is manipulated by the driver to select one position from among a plurality of positions which may include, e.g., an "N" position (neutral), a "2" position (2nd gear), a "3" position (3rd gear), a "4" position (4th gear), a "D" position (automatic gear changing position), and an "R" position (reverse gear). That is, the driver manipulates the selecting lever 12a in order to select a desired control mode of the transmission 5. The selecting lever 12a is coupled with a selected position sensor 13 for producing a selected position signal SP showing the position of the selecting lever 12a.

An acceleration sensor 14 is associated with an accelerator pedal 15 and produces an acceleration signal A showing the degree of depression of the accelerator pedal 15. Reference numeral 16 indicates a known vehicle speed sensor mounted on the propeller shaft 9 for producing a vehicle speed signal VS showing the running speed of the vehicle powered by the engine 2.

The gear position signal GP, the selected position signal SP, the vehicle speed signal VS and the acceleration signal A are applied to a target position setting unit 17 which is adapted to produce a target position signal GT showing the target gear position to which the transmission is to be shifted at each instant. A detailed explanation of the target position setting unit 17 will be given later.

The target position signal GT, the clutch signal CL and the gear position signal GP are applied to a well known design gear-changing control unit 18 of which includes a central processing unit (CPU) 19, read-only memory (ROM) 20, random access memory (RAM) 21 and I/O interface 22, which are interconnected by a bus 23. The input signals GT, CL and GP are converted into digital form in the I/O interface 22 and are processed in accordance with a control program stored in advance in the ROM 20 to produce a shift control signal SF, a clutch control signal CS and an engine control signal ES, which serve to shift the transmission 5 into the gear position indicated by the target position signal GT.

The shift control signal SF is applied to the gear changing actuator 10 for controlling the gear changing actuator 10 so as to shift the transmission into the target gear position, while the clutch control signal CS is applied to a clutch control unit 24 for producing a clutch driving signal CD in response to the clutch control signal CS for commanding the engagement or disengagement of the clutch 4. The clutch driving signal CD is for driving the clutch actuator 6 so as to gradually engage or disengage the clutch 4.

The level of the engine control signal ES becomes high when the clutch control signal CS indicates the command for disengaging the clutch 4 during the gear shift operation, and the engine control signal ES is supplied to an engine control unit 25 which also receives the acceleration signal A and an engine speed signal NE output by a known speed sensor 26 and indicating the rotational speed of the engine 2.

The engine control unit 25 functions to regulate the engine speed based on the manipulation of the accelerator pedal 15. Namely, the engine control unit 25 is responsive to the acceleration signal A to produce an engine speed control signal EC, which is applied to a throttle actuator 27 for controlling the fuel supply to the engine 2. Thus, the throttle actuator 27 is actuated by the engine speed control signal EC in accordance with the degree of depression of the accelerator pedal 15 and the engine speed can be regulated in accordance with the manipulation of the accelerator pedal 15. The above-described operation is performed in the engine control unit 25 only when the level of the engine control signal ES is low.

When the level of the engine control signal ES applied to the engine control unit 25 is high, the engine control unit 25 functions to maintain the engine speed at its idling speed in response to the engine speed signal NE. The level of the engine control signal ES is high when the operation for changing gear is being performed, whereby it is possible to suppress increase in engine speed during the gear shifting operation.

Thus, the gear-changing control unit 18 controls the clutch actuator 6, the gear changing actuator 10 and the engine control unit 25 so as to automatically shift the transmission 5 into the target gear position in accordance with the target position signal GT.

An explanation will now be given regarding the constitution of the target position setting unit 17. The target position setting unit 17 has a first data generator 31 with a first memory 33 and a second data generator 32 with a second memory 34.

The first memory 33 stores a plurality of sets of initial gear shift map data for determining an initial target gear position to which the gear should be initially shifted after the selecting lever 12a of the selector 12 is moved from one position to another. A separate set of initial gear shift map data is provided for each position of the selecting lever 12a of the selector 12. The first data generator 31 is responsive to the selected position signal SP to read out from the first memory 33 the data set corresponding to the selected position indicated by the selected position signal SP at that time. The data set output by the first data generator 31 is applied as first map data $MD_1$ to one fixed contact 35a of a switch 35.

The second memory stores a plurality of sets of normal gear shift map data for determining a normal target gear position to which the gear is to be shifted after the gear has been shifted to an initial target gear position according to the initial gear shift map data. A plurality of sets of normal gear shift map data are provided for each position of the selecting lever 12a of the selector 12. The second data generator 32 is responsive to the selected position signal SP and the target position signal GT. At first, a group of data sets corresponding to the position of the selecting lever 12a is selected, and then one data set is further selected from the group in accordance with the target position signal GT. Thus, the finally selected data set is read out from the second memory 34 as second map data $MD_2$ which is applied to another fixed contact 35b of the switch 35. However, the second data generator 32 may be arranged so as to produce the necessary second map data $MD_2$ in response to only the selected position signal SP, similarly to the case of the first data generator 31.

To control the switching of the switch 35, there is provided a switching control unit 36 which functions in response to the selected position signal SP, the gear position signal GP and the acceleration signal A to discriminate as to whether or not the system 1 is in the transitory condition between the time that the position of the selector 12 is changed and the time that the transmission 5 is shifted to the initial gear position based on the first map data $MD_1$. The switching control unit 36 produces a switching control signal SS whose level is determined in accordance with the discrimination as to the transitory condition. That is, the level of the switching control signal is high when the system 1 is in the transitory condition and is low when the system 1 is not in the transitory condition. The switch 35 is switched over in response to the switching control signal SS in such a way that the switch 35 is in one state shown by the broken line when the level of the signal SS is high and is in the other state shown by the solid line when the level of the signal SS is low.

The first map data $MD_1$ or the second map data $MD_2$ is applied to a calculation unit 37 to which the acceleration signal A and the vehicle speed signal VS are also applied. Thus, in the calculation unit 37, a map calculation is carried out in the conventional manner for determining the target gear position on the basis of the selected map data, that is, the first or second map data $MD_1$ or $MD_2$, in response to the acceleration signal A and the vehicle speed signal VS. The calculation result is output as the target position signal GT, which is applied to the gear-changing control unit 18.

An explanation of the operation of the system 1 will be given in conjunction with FIGS. 2 and 3.

Figure 2:
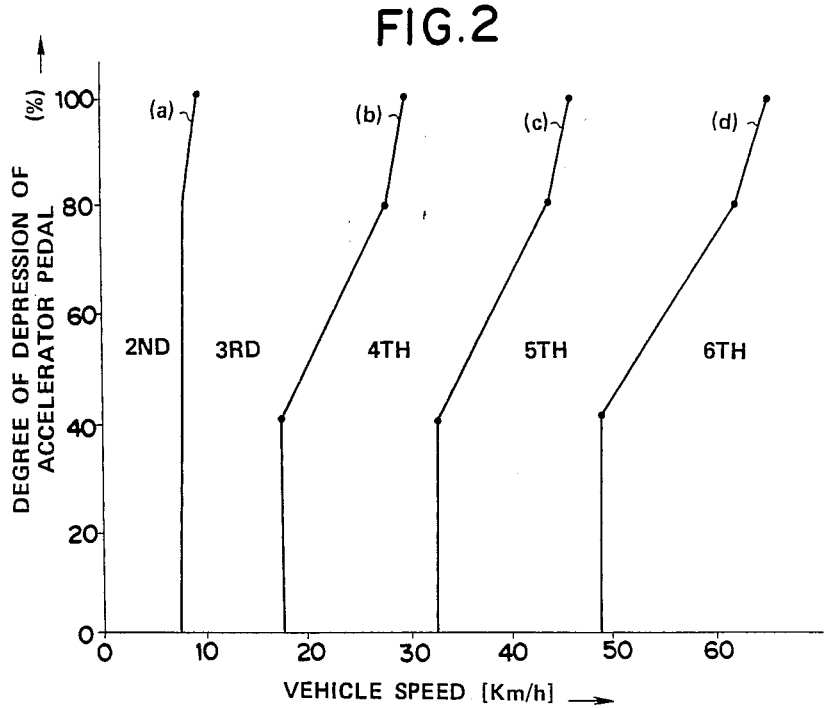
FIG. 2 is a graph showing initial gear shift characteristics determined by a set of first map data.

When the selector 12 is being moved, for example, to the "D" position from some other position, the switching control signal SS produced by the switching control unit 36 assumes high level so as to supply the first map data $MD_1$ based on the characteristics shown in FIG. 2 to the calculation unit 37. Thus, the initial target gear position is determined in accordance with the vehicle speed and the degree of depression of the accelerator pedal 15 at that time and a target position signal GT indicating the calculated initial target gear position is produced.

The gear-changing control unit 18 is responsive to the target position signal GT to control the gear transmission 5, the clutch 4 and the engine 2 so as to shift the transmission 5 to the initial target gear position indicated by the signal GT.

After the gear has been shifted accordingly, the switching control unit 36 produces a low level switching control signal SS for switching the switch 35 to the condition shown by the solid line in FIG. 1. Accordingly, after this, the second map data $MD_2$ according to the characteristics shown in FIG. 3 is applied to the calculation unit 36 instead of the first map data $MD_1$. As a result, a target gear position depending upon the degree of depression of the accelerator pedal 15 and the vehicle speed is determined in accordance with the characteristic shown in FIG. 3 and the gear shift operation is automatically carried out in accordance with the target position signal GT indicating the results of this determination.

Figure 3:
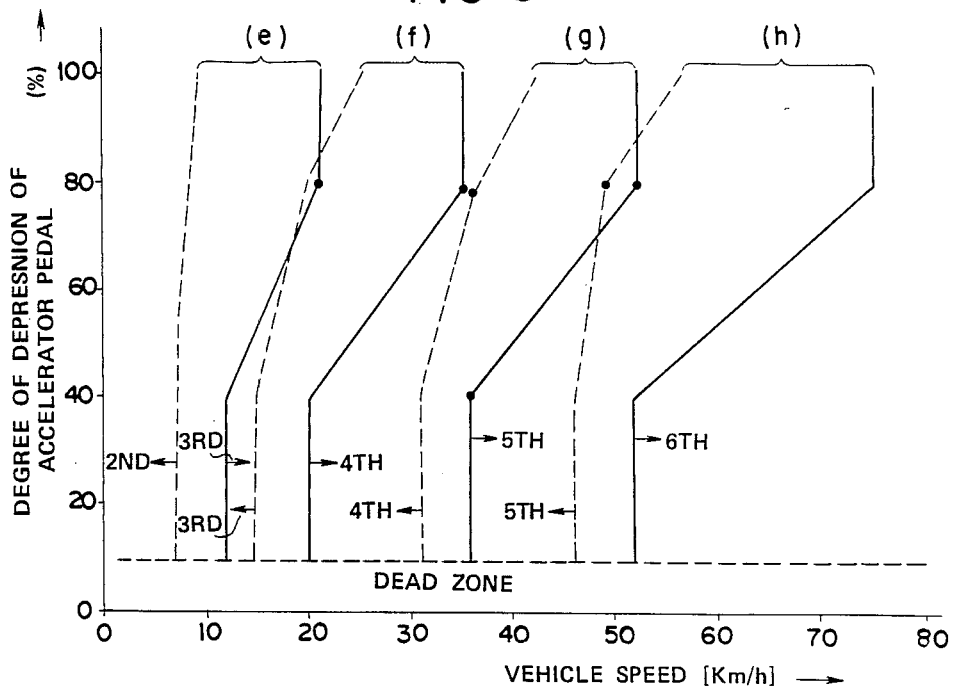
FIG. 3 is a graph showing normal gear shift characteristics determined by a set of second map data.

The set of initial gear shift map data represented by the characteristics shown in FIG. 2 for "D" position of the selector 12 and the corresponding set of normal gear shift map data represented by the characteristics shown in FIG. 3 are determined as follows. As seen from FIGS. 2 and 3, at small degrees of depression of the accelerator pedal 15, except for the dead zone of FIG. 3, the characteristic lines (a) to (d) showing the boundary lines between a plurality of regions representing the respective gear shift positions in the gear shift characteristic plane of FIG. 2 are positioned approximately at the middle of the corresponding regions (e) to (h) representing the respective gear shift positions in the gear shift characteristic plane of FIG. 3.

Therefore, when the initial target gear position is determined in accordance with the characteristics shown in FIG. 2, it follows that the operation for shifting up by one gear stage must be carried out in accordance with the characteristics shown in FIG. 3, making it possible to prevent the gear shift operation from being carried out just after the operation of the selector 12. Furthermore, since the gear will be shifted up after sufficient acceleration of the vehicle has obtained by the depression of the accelerator pedal 15, excellent gear shift performance can be ensured without the occurrence of uncomfortable shock after the operation of the selector 12.

The above explanation is given for the operation in the case where the selector 12 is moved to the "D" position from any other position. However, the operation in other cases is carried out in a similar manner.

Figure 4:
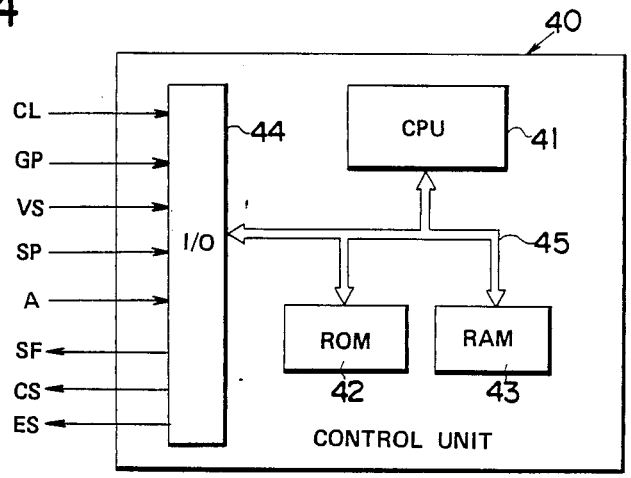
FIG. 4 is a block diagram showing a control unit which functions both as a target position setting unit and as a gear-change control unit.

The functions of the gear-changing control unit 18 and the target position setting unit 17 may also be realized by the use of a single microcomputer, and such a control unit is shown in FIG. 4.

The control unit 40 shown in FIG. 4 is a microcomputer system for performing the functions of both units 17 and 18. The control unit 40 has a central processing unit 41, a read-only memory (ROM) 42, a random access memory (RAM) 43 and an I/O interface 44, which are interconnected by a bus 45. The gear position signal GP, the selected position signal SP, the vehicle speed signal VS, the acceleration signal A and the clutch signal CL are applied to the I/O interface 44 and a control program stored in the ROM 42 is executed to process these input signals and to output the shift control signal SF, the clutch control signal CS and the engine control signal ES. In this case, the same data as that stored in the first and second memories 33 and 34 is stored in the ROM 42, and the first map data $MD_1$ and the corresponding second map data $MD_2$ are also used in the control unit 40.

Figure 5:
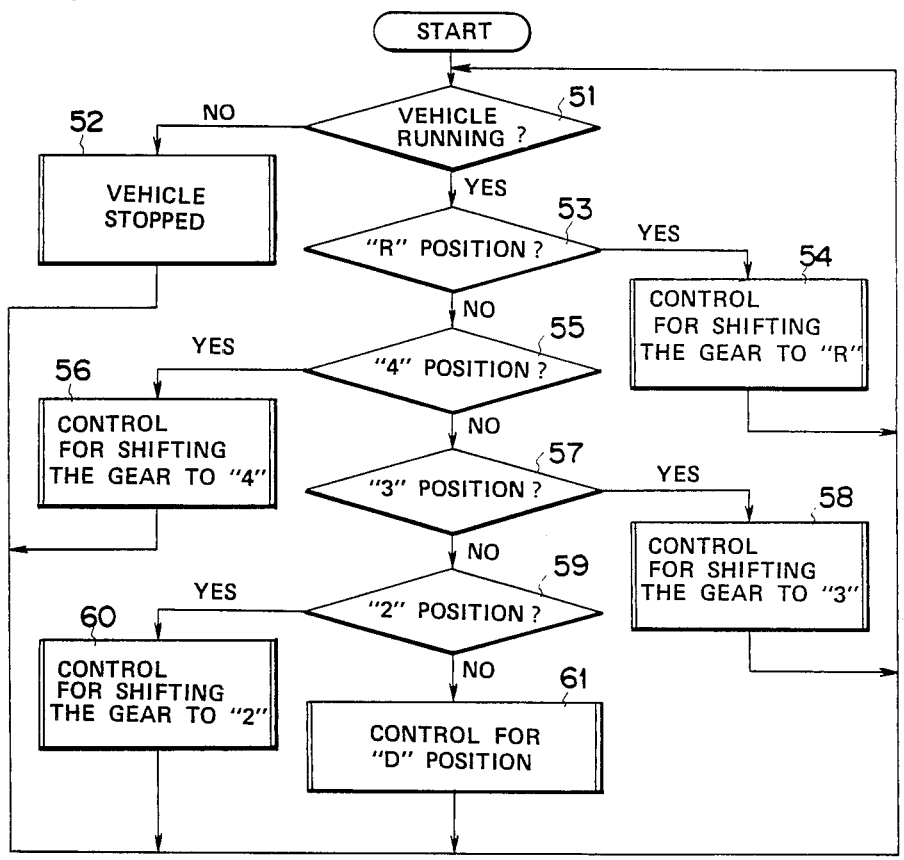
FIG. 5 is a flowchart showing a control program executed in the control unit shown in FIG. 4.
Figure 6:
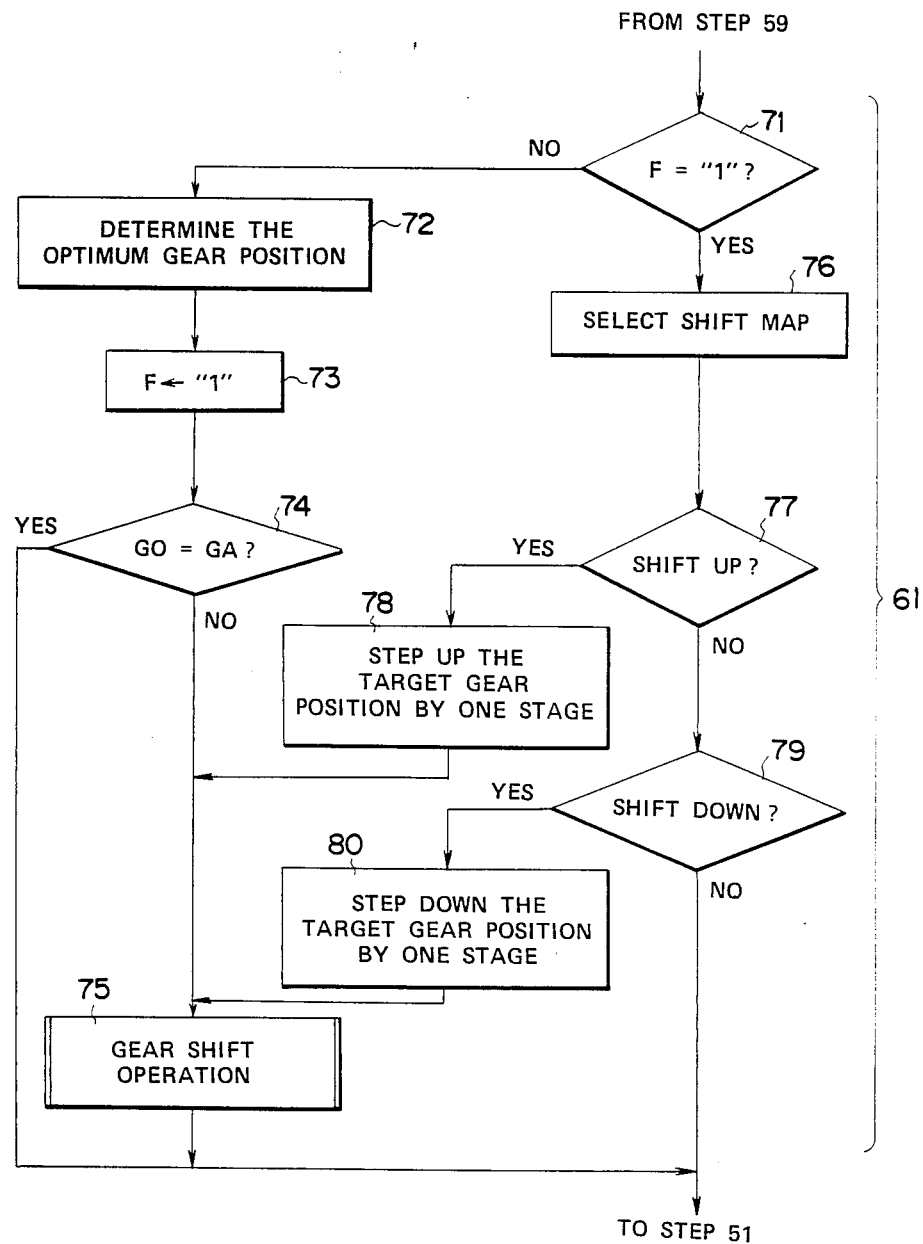
FIG. 6 is a detailed flowchart of one step in the flowchart of FIG. 5.

A control program to be executed in the control unit 40 is shown in the flowcharts of FIGS. 5 and 6.

After the start of this program, a discrimination is made in step 51 on the basis of the vehicle speed signal VS as to whether or not the vehicle is running. The determination of step 51 becomes NO when the vehicle is stopped, and the control for the stopped state is carried out in step 52. Then, the operation returns to step 51. The determination in step 51 becomes YES when the vehicle is running and the operation moves to step 53 in which a discrimination is made as to whether or not the selector 12 is set at the "R" position. Where the discrimination is YES, the operation moves to step 54 in which control for shifting to the reverse gear position is carried out and then returns to step 51. The operation moves to step 55 when the discrimination in step 53 is NO, and a discrimination is made as to whether or not the selector 12 is in the "4" position. When the discrimination in step 55 is YES, the operation moves to step 76 wherein the control for shifting to the 4th gear position is carried out and then returns to step 51. When the discrimination in step 55 is NO, the operation moves to step 57 wherein a discrimination is made as to whether or not the selector 12 is in the "3" position. When the discrimination in step 57 is YES, the operation moves to step 58 wherein the operation for shifting to the 3rd gear position is carried out and then returns to step 51. When the discrimination in step 57 is NO, the operation moves to step 59 wherein a discrimination is made as to whether or not the selector 12 is in the "2" position. When the discrimination in step 59 is YES, the operation moves to step 60 wherein the operation for shifting to the 2nd gear position is carried out and then returns to step 51. When the discrimination in step 59 is NO, the operation moves to step 61 wherein the gear shift operation for the "D" position of the selector 12 is carried out.

A detailed explanation for step 61 will now be given on the basis of FIG. 6. In step 71, a discrimination is made as to whether or not a shift flag F, which is reset in an initialization procedure of this program, is in set. Therefore, since the shift flag F is in the reset state at the time of the first execution of step 71, the discrimination in step 71 becomes NO. Thus, the operation moves to step 72 wherein a map calculation for obtaining the optimum gear position at that time is carried out on the basis of the first map data $MD_1$ corresponding to the gear shift characteristics of FIG. 2 in accordance with the signals A and VS. Thus, the initial gear shift position is determined. The shift flag F is set in step 73.

A discrimination is made in step 74 as to whether or not the optimum gear position GO obtained in step 72 is the same as the actual gear position GA shown by the signal GP. It follows that the execution of step 61 is terminated when the discrimination in the step 74 is YES, while the operation moves to step 75 when the discrimination of step 74 is NO. In step 75, the operation for shifting the gear to the optimum gear position obtained in step 72 is performed.

When the step 71 is executed again without any change having been made in the position of the selector 12 since the preceding execution, the discrimination in the step 71 becomes YES because of the set state of the shift flag F and the operation moves to step 76 wherein map data is selected from the group of second map data in correspondence with the target gear position at that time. That is, the data showing a condition for the shift range corresponding to the target gear position at that time is selected from the data representing the gear shift characteristics shown in FIG. 3. Thus, in step 77 it is discriminated on the basis of the signals A and VS whether or not the condition of operation of the vehicle is such that the gear is to be shifted up. When the discrimination in step 77 is YES, the operation moves to step 78 wherein the target gear position is stepped up by one stage and then moves to step 75.

When the discrimination in step 77 is NO, the operation moves to step 79 wherein a discrimination is made on the basis of the signals A and VS as to whether or not the condition of operation of the vehicle is such that the gear is to be shifted down. When the discrimination in step 79 is YES, the operation moves to 80 wherein the target gear position is stepped down by one stage and then moves to step 75. When the discrimination in step 79 is NO, it follows that the execution of the step 61 is terminated.

I claim:

1. An automatic transmission system having a gear transmission to which a rotational output from an internal combustion engine can be applied through a clutch, said system comprising:
   a selector;
   means coupled with said selector for producing a selected position signal indicative of a position selected by said selector;
   a sensing means for generating at least one condition signal showing at least one condition of the operation of said system;
   means for producing a position signal indicating an actual gear position set in said gear transmission, said gear transmission having at least gear positions n and n+1;
   a first data generating means responsive to said selected position signal for generating a set of initial gear shift map data corresponding to a position of said selector at that time, said initial gear shift map data being for determining an initial target gear position to which the gear should be initially shifted after the position of said selector is changed, said initial gear shift map data corresponding to a plurality of characteristic lines showing the boundaries between a plurality of regions representing the respective gear positions n and n+1 in an initial gear shift characteristic plane;
   a second data generating means responsive to at least said selected position signal for generating a set of normal gear shift map data corresponding to a position of said selector at that time, said normal gear shift map data being for determining a normal target gear position to which the gear should be shifted after the gear is shifted to said initial target gear position determined in accordance with said initial gear shift map data, said normal gear shift map data corresponding to a plurality of characteristic lines showing the boundaries for gear shift-up and gear shift-down as represented in a normal gear shift characteristic plane, and for a predetermined range of depression of an accelerator pedal of said internal combustion engine, the characteristic line showing the boundary between the nth gear position and the n+1 th gear position in said initial gear shift characteristic plane being positioned within a region defined by the characteristic lines showing the boundary for shifting down from the n+1 th gear position to the nth gear position and the boundary for shifting up from the nth gear position to the n+1 th gear position in said normal gear shift characteristic plane;

a selecting means responsive to at least said selected position signal and said actual position signal for selecting one of the outputs of said first and second data generating means;

a calculating means responsive to the output from said selecting means and said condition signal for calculating a target gear position;

a first actuating means associated with said gear transmission for actuating the operation for shifting the gear of said gear transmission;

a second actuating means associated with said clutch for actuating the engaging/disengaging operation of said clutch;

a control means responsive to the output from said calculating means and said actual position signal for controlling said first and second actuating means so as to shift the gear to said calculated target gear position.

2. The system as claimed in claim 1 wherein said first data generating means includes a first memory means in which are stored a plurality of sets of initial gear shift map data determined to correspond to the respective positions of said selector and the corresponding set of initial gear shift map data can be read out in response to said selected position signal.

3. The system as claimed in claim 1 wherein said second data generating means includes a second memory means in which are stored a plurality of sets of normal gear shift map data determined to correspond to the respective positions of said selector and the corresponding set of normal gear shift map data can be read out in response to said selected position signal.

4. The system as claimed in claim 1 wherein said second data generating means generates a set of normal gear shift map data in response to said selected position signal and the output from said calculating means.

5. The system as claimed in claim 4 wherein said second data generating means includes a second memory means in which are stored a plurality of sets of normal gear shift map data, said plurality of sets being divided into a plurality of groups with one group of said sets being assigned to each position of said selector, and one data set is selected from the corresponding group in accordance with the output from said calculating means.

6. The system as claimed in claim 1 wherein said selecting means has a switch control means for determining in response to said selected position and said position signal which of the outputs of said first and second data generating means is to be sent to said calculating means, and a switch for selecting the output determined by said switch control means and sending it to said calculating means.

7. The system as claimed in claim 6 wherein said switch control means discriminates whether or not said system is in a transitory condition between the time that the position of said selector is changed and the time that said gear transmission is shifted to the initial position based on the set of initial gear shift map data.

8. The system as claimed in claim 1 wherein said characteristic line showing the boundary between the nth gear position and the n+1 th gear position in said initial gear shift characteristic plane is positioned approximately at the middle of said region defined by the characteristic lines in said normal gear shift characteristic plane.

9. The system as claimed in claim 1 wherein the upper end of said predetermined range exceeds an accelerator pedal depression of at least about forty percent (40%).

* * * * *